United States Patent [19]

Bart et al.

[11] Patent Number: 4,930,279

[45] Date of Patent: Jun. 5, 1990

[54] MEANS FOR FILLING, SEALING AND CONCEALING AN ELONGATED GROOVE

[75] Inventors: Joseph Bart, St. Charles; Burnell J. Wollar, Barrington, both of Ill.

[73] Assignee: Phillips Plastics Corporation, Prescott, Wis.

[21] Appl. No.: 276,574

[22] Filed: Nov. 28, 1988

[51] Int. Cl.⁵ ............................................. E04C 1/34
[52] U.S. Cl. ..................................... 52/466; 52/468; 52/717.1; 296/213
[58] Field of Search ................ 52/717, 718, 462, 471, 52/472, 461, 466, 468, 397, 586; 296/210, 213, 208, 29

[56] References Cited

U.S. PATENT DOCUMENTS

| | | | |
|---|---|---|---|
| 3,381,436 | 5/1968 | Elliott et al. | 52/471 X |
| 3,508,369 | 4/1970 | Tennison | 52/461 X |
| 3,570,205 | 3/1971 | Payne | 52/466 |
| 3,897,967 | 8/1975 | Barenyi | 52/718 X |
| 4,067,155 | 1/1978 | Ruff et al. | 52/466 X |
| 4,304,435 | 12/1981 | Everts et al. | 296/213 |
| 4,417,762 | 11/1983 | Imai et al. | 296/210 |
| 4,603,528 | 8/1986 | Sigerist | 52/471 X |
| 4,618,181 | 10/1986 | Tokuda et al. | 296/29 X |

Primary Examiner—Carl D. Friedman
Attorney, Agent, or Firm—Nilles & Nilles, S.C.

[57] ABSTRACT

A two-piece assembly is provided for filling, sealing and concealing an elongated groove formed in a surface of an automobile body. The groove, measured transversely, is wider at the bottom than at the top. The assembly comprises releasably attachable first and second members. The elongated elastic (molded rubber) first member is manually disposed in the groove and has an elongated slot extending inwardly from the exposed top side thereof. The elongated rigid (plastic) second member comprises a lower portion having serrated opposite lateral sides and an upper trim molding portion. The lower serrated portion is manually inserted in the slot to effect transverse outward expansion of the lateral sides of the first member so that the first member fills and seals the groove and is frictionally secured therein. The upper trim molding portion lies against the surface of the automobile body and serves to conceal both the groove and the lower portion of the second member, when the serrated lower portion is fully inserted in the slot. The second member is forceably detachable from the first member for replacement, if necessary.

14 Claims, 2 Drawing Sheets

MEANS FOR FILLING, SEALING AND CONCEALING AN ELONGATED GROOVE

BACKGROUND OF THE INVENTION

1. Field of Use

This invention relates generally to means for filling, sealing and concealing an elongated groove formed in the surface of a structure, such as a groove formed in a body surface during construction of an automobile body whereat two flanged sheet metal panels are overlapped and welded together.

In particular, it relates to such means which take the form of an elongated two-piece assembly comprising an elastic slotted first member insertable in the groove and a rigid second member comprising a serrated lower portion detachably insertable into the slot of the first member to expand the latter in the groove and a molding trim upper portion to conceal the groove.

2. Description of the Prior Art

In the manufacture of some types of automobile bodies, for example, a flanged edge of a sheet-metal roof panel is joined by spot-welding to an overlapping flanged edge of an adjacent sheet-metal side panel. The construction is carried out in such a manner as to result in creation in the auto body surface of an elongated groove about six inches long, one-half inch wide and one-half inch deep and having a seam along the bottom thereof. This groove, which exists solely as a result of manufacturing techniques, is not acceptable in the finished body and must be sealed against the water leakage and concealed for aesthetic reasons.

Heretofore, the practice was to fill the groove with molten lead or solder-lead alloy and then to manually grind and polish the solidified lead so as to provide a smooth, aesthetically pleasing, finished body surface. The lead also served to seal the seam against water leakage from rain or water sprayed on the finished auto body in a car wash and, obviously, prevented water from accumulating in the groove. For manufacturing reasons, the overlapping flanges of the panels to be welded were pre-shaped so that the elongated groove, measured transversely, was slightly wider at the bottom than at the top. Incidentally, this shape insured that the solidified lead remained in the joint and did not work free. However, the use of lead to fill grooves has fallen into disfavor because of lead's toxic qualities and because the production technique of filling and grinding is time-consuming and unduly costly.

One prior art approach that was developed and is now in use to fill a groove and avoid the use of lead is depicted in prior art FIG. 4 of the present application. This approach involves welding two spaced T-head metal studs 70 to the floor of a groove 14A, pouring a solidifiable liquid sealer 72 onto the floor of the groove which hardens to form a seal along a seam 15A to prevent water leakage therethrough, painting the body, snapping plastic molding clips 74 onto the studs 70 after painting the body, and finally snapping an elongated decorative plastic molding strip 76 onto the clips 74 to conceal the groove and the components therein.

However, this approach is not entirely satisfactory. The problem primarily concerns the metal studs 70, but other problems also arise. For example, the welded studs 70 are installed early in the body-building process and are sometimes accidentally bent or broken during welding or at later stages of construction. The sealer 72, which is poured into groove 14A after welding of the studs 70 but before painting of the auto body, sometimes is accidentally slopped up onto the studs 70 and solidifies thereon so that later on the molding clips 74 will not fit over the studs. If a stud 70 is bent, missing, or covered with sealer 72, molding clip 74 cannot be installed thereon and, therefore, molding strip 76 cannot be mounted on the clip. The body then must go0 to a repair area where, for example, a head-liner and many other previously installed components are removed, so that the defective stud 70 can be drilled out, a repair stud (not shown) welded on, the joint resealed, and the components re-assembled. This is a complicated and expensive repair.

Even if good parts are properly installed and assembled according to the prior art approach and the finished automobile is released for sale and put in use, driving the vehicle through a car wash or in a heavy rain storm results in groove 14A, which is substantially empty, filling with water which leaks thereinto beneath the edge of molding strip 76. At some seasons of the year, water collected in groove 14A may freeze and expand thereby causing molding strip 76 to rise. Repeated thawing and freezing can cause the molding strip 76 to rise up far enough away from the body surface to a position where it can be broken and must be replaced. Replacement is a very expensive operation, whether the vehicle still within warranty or whether the cost is borne by the auto owner.

SUMMARY OF THE PRESENT INVENTION

The present invention provides improved means for filling, sealing and concealing an elongated groove formed in the surface of a structure. The improved means are especially well-suited for use with a groove formed in the surface of an automobile body during construction, such groove being at a location whereat two flanged sheet metal panels are overlapped to form a same and are spot-welded together along the seam so as to define an elongated groove which is slightly wider at the bottom then at the top. However, the improved means could be used with other grooves formed in other structures and having other shapes.

The improved means takes the form of an assembly which comprises two (first and second) separate elongated components or members which are releasably connectable to each other.

The first member is molded of flexible, resilient, elastic material, such as natural or synthetic rubber, and has an exterior shape which approximates the shape of the groove into which it is to be inserted. The first member has an elongated slot extending inwardly from the top side thereof which is bounded by opposite side walls, a bottom wall and end walls.

The second member is formed of rigid material, such as molded plastic, and has elongated upper and lower portions which are integrally joined together. The upper portion takes the form of a decorative molding. The lower portion has opposite lateral sides which are provided with longitudinally extending serrations.

In use, the first member is manually disposed in the groove. Then, the serrated lower portion of the second member is aligned with and pushed into the slot in the first member thereby causing the side walls of the first member to move outwardly to tightly engage the lateral side of the groove and the bottom wall to move downwardly to tightly engage the bottom of the grooved. Thus, the groove is substantially filled by the first member and any seam in a wall thereof is sealed against leakage. When the second member is fully installed, the upper decorative molding portion thereof overlies and conceals the groove and the first member therein and the outer edges of the upper portion lie flush against the surface in which the groove is formed.

In the preferred embodiment disclosed herein, the first member is shaped for installation in a groove, such as shown in FIG. 4, in which unused studs 70 have been provided. However, the preferred embodiment is also usable in a groove in which studs 70 are not provided. Therefore, to afford clearance for studs, such as 70, the bottom wall of the first member has recesses formed therein to afford clearance for the studs 70 and, as a result, corresponding bottom wall projections extend into the bottom of the slot in the first member. The serrated lower portion of the second member is provided with recesses to afford clearance for the bottom wall projections.

Other more detailed aspects of the invention are described hereinafter in the description of the preferred embodiment.

The improved means in accordance with the present invention offers several important advantages over the prior art. For example, the improved means can be used in a groove in which prior art T-studs, molding clips and poured sealer have been omitted or can be used as a retrofit in a groove in which those components still exist. However, use of the improved means on original equipment allows these prior art components to be entirely eliminated, as well as the installation steps therefor, thereby significantly reducing production, repair and replacement costs. Furthermore, applicants' first member substantially fills the groove and prevents any water from collecting therein. The first member also operates to seal any open seam in a groove against water leakage therethrough. The first member frictionally engages the walls of the groove to rigidly and tightly secure the entire assembly in place in the groove until the second member is intentionally detached from the slot. The improved means is easy and economical to service fabricate, install and service. Other objects and advantages will hereinafter appear.

DRAWINGS

DESCRIPTION OF A PREFERRED EMBODIMENT

Figure 1:
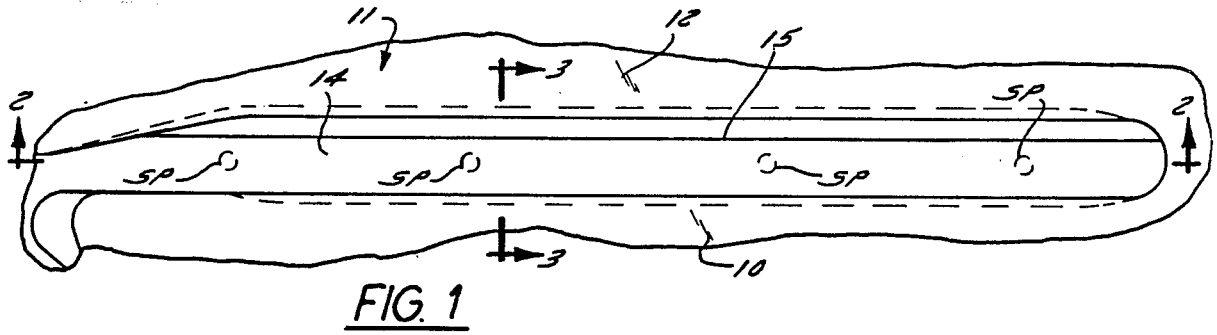
FIG. 1 is a top plan view of a portion of the exterior of an automobile body and showing a groove formed in a surface thereof along a joint where two body panels are joined together by welding.
Figure 2:
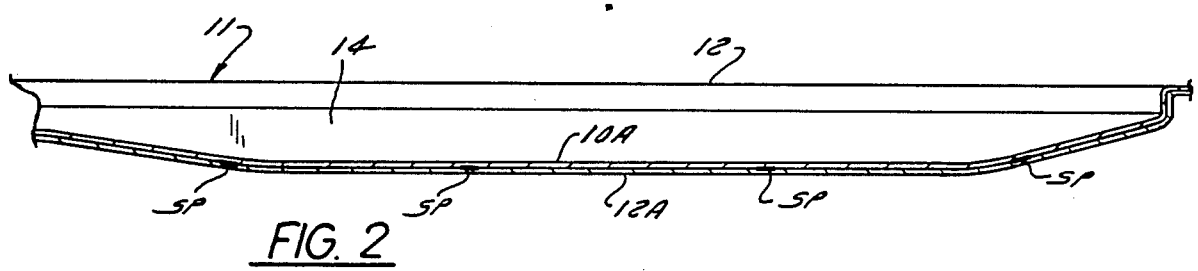
FIG. 2 is a longitudinal cross-section view of the groove taken on line 2—2 of FIG. 1.
Figure 3:
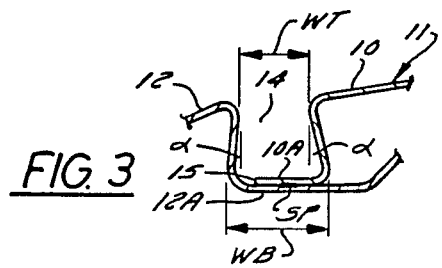
FIG. 3 is a transverse cross-section view of the groove taken on line 3—3 of FIG. 1.

FIGS. 1, 2 and 3 show a portion of an automobile body which comprises a sheet-metal roof panel 10 and a sheet-metal side panel 12 which are shaped and welded together in such a manner as to define a slightly curved body surface 11 having a groove 14 formed therein. As FIG. 3 shows, groove 14 is formed by a flange 10A on panel 10 which overlaps a flange 12A on panel 12 and the flanges are spot-welded together at intervals, as at points SP, to form a seal 15 which is subject to water leakage. Groove 14 has a bottom width WB and a top width WT which, as FIG. 3 shows, is less than the bottom width WB. The difference in groove width results from each side portion of flange 10A and 10B being shaped so as to slant outwardly by an angle α (about 5° to 10°) in proceeding from the top to the bottom of groove 14 and is required by certain manufacturing procedures not related directly to the present invention. The walls defining groove 14 are rounded or contoured as shown so that, for the most part, no sharp angles or unduly tight corners exist in the groove.

Figure 4:
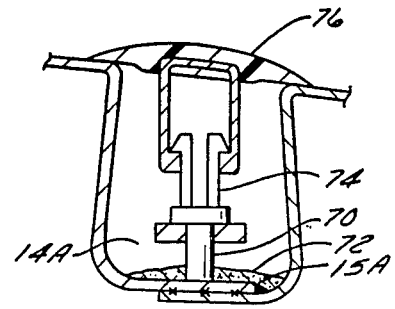
FIG. 4 is an enlarged transverse cross-section view of the groove of FIG. 3 and showing prior art means therein for sealing and concealing the groove.
Figure 15:
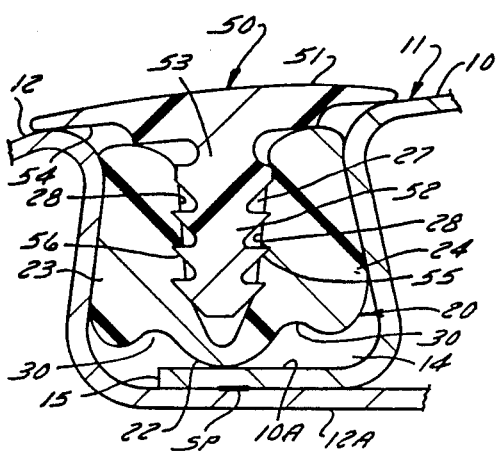
FIG. 15 is an enlarged transverse cross-section view, similar to FIG. 14, showing the first and second members secured together and forming an assembly installed in the groove.
Figure 14:
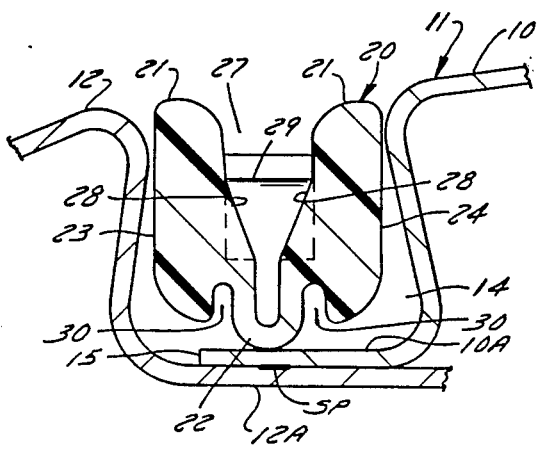
FIG. 14 is a side elevation view, partly in cross-section, of the first member installed in the groove.
Figure 5:
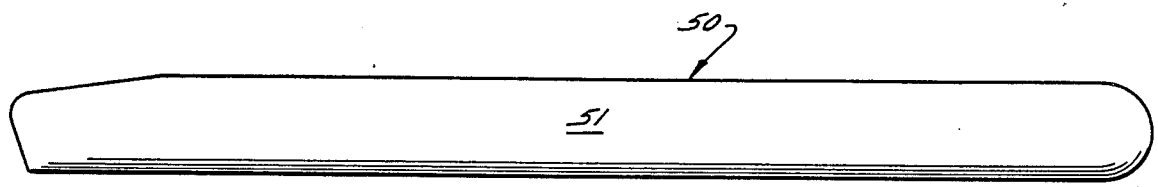
FIG. 5 is a top plan view of a second member of an improved means for filling, sealing and concealing the groove in accordance with the invention.
Figure 6:
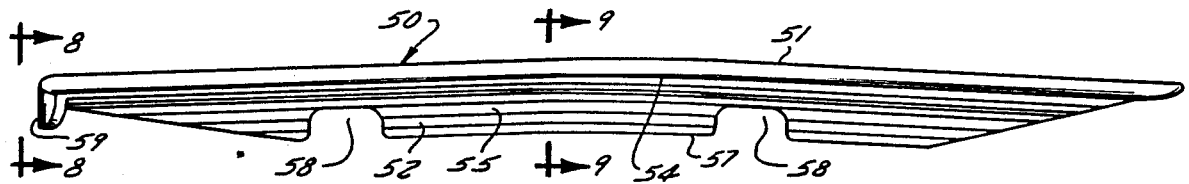
FIG. 6 is a side elevation view of the second member of FIG. 5.
Figure 7:
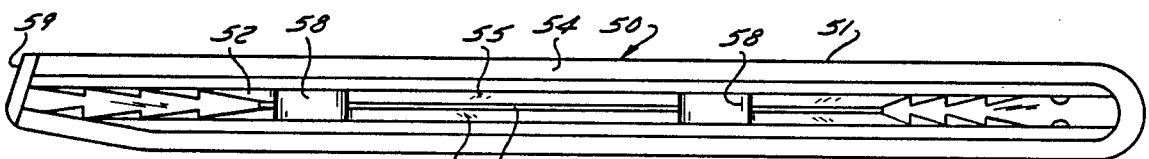
FIG. 7 is a bottom plan view of the second member of FIGS. 5 and 6.
Figures 8, 9:
FIG. 8 is an end view of the second member.
FIG. 9 is a transverse cross-section view of the second member taken on line 9—9 of FIG. 6.

Referring now to FIGS. 5 through 15, means in accordance with applicants' invention for filling, sealing and concealing groove 14 take the form of a two-piece assembly which comprise a first member 20 (FIGS. 10 through 15) and a second member 50 (FIGS. 5 through 9 and 14, 15). FIG. 14 shows member 20 installed in groove 14. FIG. 15 shows members 20 and 50 fully assembled in groove 14. FIG. 4 shows prior art means for sealing and concealing groove 14A.

Figure 13:
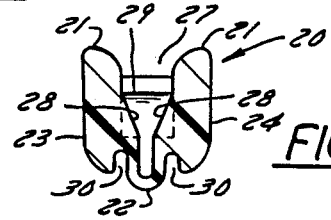
FIG. 13 is a transverse cross-section view of the first member taken on line 13—13 of FIG. 11.
Figure 10:
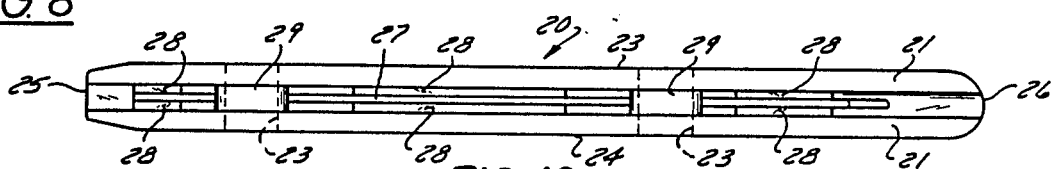
FIG. 10 is a top plan view of a first member of the improved means in accordance with the present invention.
Figure 11:
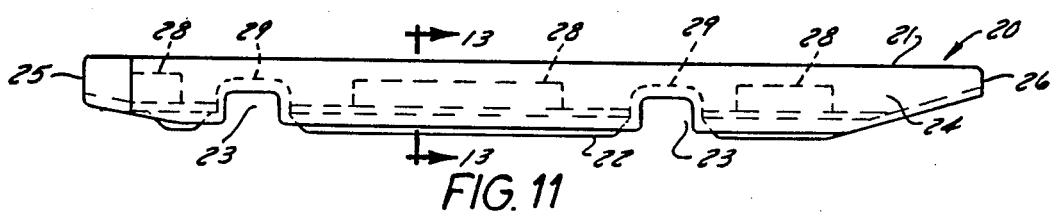
FIG. 11 is a side elevation view of the first member of FIG. 10.
Figure 12:
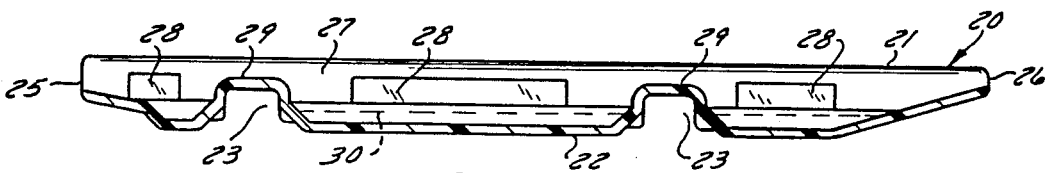
FIG. 12 is a longitudinal cross-section view of the first member of FIGS. 10 and 11.

Referring to FIGS. 10 through 13, first member 20 is fabricated by injection molding from flexible, resilient, elastic material, such as natural or synthetic rubber. First member 20 is elongated and, as FIG. 13 shows, has an upper side 21, a lower or bottom side 22, two opposite lateral sides 23 and 24, and (FIG. 10) opposite ends 25 and 26. First member 20 has an elongated slot 27 which extends inwardly from upper side 21 and, as FIG. 15 shows, is adapted to receive a serrated lower portion 52 of second member 50, hereinafter described. The opposite lateral side walls defining slot 27 are provided with integrally formed, sloped ramps 28 at intervals therealong.

In the preferred embodiment disclosed herein, first member 20 is shaped for installation in groove 14 shown in FIGS. 1, 2 and 3 but is also usable in groove 14A, such as shown in FIG. 4, in which unused studs 70 have been provided. Therefore, lower side 22 of first member 20 has recesses 23 formed therein to afford clearance for the studs 70, shown in FIG. 4, and, as a result, corresponding bottom wall projections 29 extend into the bottom of slot 27 in first member 20. Furthermore, the serrated lower portion 52 of second member 50 is provided with recesses 58 to afford clearance for the bottom wall projections 29 in slot 27 of first member 20. However, the preferred embodiment disclosed herein is also usable in groove 14 in which the studs 70 are not provided.

First member 20 has a pair of elongated lower reliever slots 30 formed in lower side 22 which are spaced apart from each other, run parallel to main slot 27 and extend inwardly from lower side 22. The reliever slots 30 render first member 20 more flexible and deformable and facilitate movement of the sides 22, 23 and 24 thereof.

As comparison of FIGS. 14 and 15 shows, the lateral sides 23 and 24 of first member 20 are generally flat and parallel to each other when first member 20 is unexpanded (FIG. 14), but flare outwardly to fill groove 14 when serrated lower portion 52 of second member 50 is inserted in main slot 27 (FIG. 15).

Referring now to FIGS. 5 through 9, second member 50 is fabricated from rigid material, such as plastic, by a process of injection molding. Second member 50 is elongated and is slightly curved in the longitudinal direction to match the curvature of the auto body surface 11 against which it lies when installed (FIG. 15). Second member 50 comprises an elongated upper portion or decorative molding 51 and an elongated lower portion 52 which are joined together by an elongated narrow neck or web 53 which is integrally connected to upper portion 51 and lower portion 52.

Upper portion 51 of second member 50 is relatively thin and the upper side 54 thereof is curved longitudinally (see FIG. 6) and transversely (see FIG. 15) so as to blend into auto body surface 11. Upper portion 51 is provided at one end thereof with a flange 59 which is receivable in groove 14 to close off the left end (FIG. 1) thereof.

Lower portion 52 of second member 50, which is receivable in groove 27 of first member 20, has two opposite lateral sides with longitudinally extending serrations 55 and 56 thereon and a narrow lower side 57. Lower portion 52 is provided with the transverse notches or recesses 58 to accommodate the projections 29, hereinbefore described which extend into slot 27 from the bottom thereof.

The members 20 and 50 are employed as follows to fill, seal and conceal groove 14. As will be understood, in any given production run of a certain model of auto bodies, the particular groove or grooves 14 on each body will be of substantially the same size and configuration. Therefore, the members 20 and 50 for use therewith are designed and fabricated with respect to size and configuration to match the groove in question.

In use, referring to FIG. 14, unexpanded first member 20 is manually installed in groove 14 and, being flexible and resilient, will generally conform to the configuration and curvature of the groove and fit loosely therein. Then, referring to FIG. 15, second member 50 is manually installed by aligning its serrated lower portion 52 with slot 27 in first member 20 and pressing second member 50 toward first member 20. Serrated lower portion 52 of second member 50 enters slot 27 and, being slightly wider than the slot, engages the ramps 28 on opposite lateral sides of slot 27, and forces the elastic lateral sides 23 and 24 of first member 20 outwardly (see FIG. 15). The reliever slots 30 in first member 20 facilitate such outward movement and, when serrated lower portion 52 is fully inserted in slot 27, the lateral sides 23 and 24 of first member 20 bulge outwardly sufficiently far to occupy the wider space at the bottom of groove 14 so as to effectively fill the groove and seal seam 15. The bottom side 22 of first member 20 tightly engages the bottom wall of groove 14 to aid in sealing seam 15 against leakage. The serrations on lower portion 52 dig into the sides of slot 27 and into the ramps 28 thereon and the orientation of the serrations is such as to firmly resist unintentional or accidental withdrawal of second member 50 from engagement with first member 20, as FIG. 15 shows. Furthermore, since expanded first member 20 now substantially fills groove 14, which is wider at the bottom than at the top, first member 20 cannot be dislodged from the groove. As FIG. 15 shows, when second member 50 is fully installed, the upper decorative molding portion 51 thereof overlies and conceals groove 14 and first member 20 therein and the outer edges of upper portion 51 lie flush against the surface 11 in which groove 14 is formed.

If second member 50 subsequently becomes damaged and needs to be replaced, it can forceably be detached from slot 27 of first member 20. If such detachment causes damage to first member 20, caused by the serrations tearing out of the ramps 28, the first member 20 can then also be removed and replaced.

We claim:

1. Means for filling, sealing and concealing a groove of fixed and constant dimensions formed in the surface of a structure comprising:
    an elastic first member for disposition in said groove and having a slot extending inwardly from a side thereof and having expandable walls bounding said slot;
    and a rigid second member comprising an upper trim portion and a lower portion insertable in said slot to effect expansion of said walls so that said first member substantially fills and seals said groove and is frictionally secured therein, and so that said upper trim portion overlies said surface of said structure and conceals said groove, said first member therein and said lower portion of said second member, said lower portion of said second member having means thereon which frictionally engage the inner surfaces of said walls of said elastic first member so as to releasably secure said second member to said first member, said means on said second member comprising serrations on said lower portion which frictionally engage and dig into said inner surface.

2. Means according to claim 1 wherein said serrations are disposed on opposite sides of said lower portion.

3. Means according to claim 1 or 2 wherein said first member is elongated and comprises upper, lower and a pair of lateral outer surfaces;
    wherein said slot is elongated and extends inwardly from the upper surface and is bounded on opposite lateral sides by ramps formed on the inner surfaces of lateral walls bounding said slot;
    and wherein the lower surface is provided with longitudinally extending reliever slots to facilitate expansion of said walls.

4. Means according to claim 3 wherein said lower surface of said first member is further provided with first recesses for accommodating any first projections existing at the bottom of said groove.

5. Means according to claim 4 wherein the bottom of said slot comprises second projections corresponding to said first recesses;

and wherein said lower portion of said second member comprises second recesses for accommodating said second projections.

6. Means according to claim 3 wherein said groove, measured transversely, is wider at the bottom that at the top and has sloped side surfaces;
   wherein sections of said slot in said first member, measured transversely, are wider at the top than at the bottom;
   and wherein said lower portion of said second member, measured transversely, is wider at the bottom than the width of the bottom of said slot so that, when said lower portion of said second member is inserted in said slot, the lateral outer surfaces of said first member engage said sloped side surfaces of said groove.

7. Means for filling, sealing and concealing an elongated groove of fixed and constant dimensions formed in a surface of a structure, said groove being defined by a bottom surface and opposite lateral side surfaces, said means comprising:
   an elongated, flexible, resilient, expandable, contractable, elastic first member for disposition in said groove,
   said first member comprising an upper outer surface, a lower outer surface for engaging said bottom surface of said groove, and a pair of opposite lateral outer surfaces for engaging said opposite lateral side surfaces of said groove,
   said first member being provided with an elongated slot extending inwardly from said upper outer surface and having expandable walls bounding said slot, including a pair of opposite lateral side walls and a bottom wall, each of said lateral walls being provided with ramp means formed on the inner surface thereof, said bottom wall being provided with longitudinally extending reliever walls formed in said lower outer surface of said first member to facilitate expansion of said walls;
   and an elongated, rigid second member comprising an elongated upper trim portion and an elongated lower portion insertable in said slot and engageable with said ramp means to effect outward expansion of said expandable walls and said bottom wall so that said first member substantially fills and seals said groove and is frictionally secured therein,
   said upper trim portion of said second member having a peripheral edge engageable with said surface of said structure when said lower section is fully inserted in said slot and operable to conceal said groove and said first member,
   said lower portion of said second member having longitudinally extending opposite lateral sides having serrations thereon for frictionally engaging and digging into the ramp means on the inner surfaces of said pair of opposite lateral side walls of said first member to inhibit withdrawal of said lower portion from said slot.

8. Means according to claim 7 wherein said lower outer surface of said first member is provided with first recesses for accommodating any first projections on said bottom surface of said groove.

9. Means according to claim 8 wherein the inner surface of said bottom wall of said first member comprising second projections extending into said slot and corresponding to said first recesses;
   and wherein said lower portion of said second member comprises second recesses for accommodating said second projections.

10. Means according to claim 7 or 8 or 9 wherein said opposite lateral side surfaces of said groove are sloped so that said groove, measured transversely, is wider at the bottom than at the top;
    wherein the inner surfaces of said opposite lateral side walls of said first member is provided with sloped ramps at spaced apart locations therealong so that portions of said slot, measured transversely, are wider at the top than at the bottom;
    and wherein said lower portion of said second member, measured transversely at said locations is wider at the bottom than the width of the bottom of said slot so that, when said lower portion of said second member is inserted in said slot, said lateral outer surfaces of said first member move outwardly to engage said sloped lateral side surfaces of said groove.

11. Means for filling, sealing and concealing a groove formed in the surface of a structure comprising:
    an elastic first member for disposition in said groove and having a slot extending inwardly from a side thereof and having expandable walls bounding said slot, said first member being elongated and comprising upper, lower and a pair of lateral outer surfaces, said slot being elongated and extending inwardly from the upper surface and bounded on opposite lateral sides by ramps formed on the inner surfaces of lateral walls bounding said slot, the lower surface being provided with longitudinally extending reliever slots to facilitate expansion of said walls, and with first recesses for accommodating any first projections existing at the bottom of said groove, the bottom of said slot comprising second projections corresponding to said first recesses;
    and wherein said lower portion of said second member comprises second recesses for accommodating said second projections;
    and a rigid second member comprising an upper trim portion and a lower portion insertable in said slot to effect expansion of said walls so that said first member substantially fills and seals said groove and is frictionally secured therein, and so that said upper trim portion overlies said surface of said structure and conceals said groove, said first member therein and said lower portion of said second member, said lower portion of said second member having serrations on opposite sides thereof which frictionally engage the inner surfaces of said walls of said first member.

12. Means according to claim 11 wherein said groove, measured transversely, is wider at the bottom than at the top and has sloped side surfaces;
    wherein sections of said slot in said first member, measured transversely, are wider at the top than at the bottom;
    and wherein said lower portion of said second member, measured transversely, is wider at the bottom than the width of the bottom of said slot so that, when said lower portion of said second member is inserted in said slot, the lateral outer surfaces of said first member engage said sloped side surfaces of said groove.

13. Means for filling, sealing and concealing an elongated groove formed in a surface of a structure, said groove being defined by a bottom surface and opposite lateral side surfaces, said means comprising:

an elongated, flexible, resilient, expandable, contractable, elastic first member for disposition in said groove, said first member comprising an upper outer surface, a lower outer surface for engaging said bottom surface of said groove, said lower outer surface being provided with first recesses for accommodating any first projections on said bottom surface of said groove, and a pair of opposite lateral outer surfaces for engaging said opposite lateral side surfaces of said groove, said first member being provided with an elongated slot extending inwardly from said upper outer surface and having expandable walls bounding said slot, including a pair of opposite lateral side walls and a bottom wall, the inner surface of said bottom wall comprising second projections extending into said slot and corresponding to said first recesses, each of said lateral walls being provided with ramp means formed on the inner surface thereof, said bottom wall being provided with longitudinally extending reliever walls formed in said lower outer surface of said first member to facilitate expansion of said walls;

and an elongated, rigid second member comprising an elongated upper trim portion and an elongated lower portion insertable in said slot and engageable with said ramp means to effect outward expansion of said expandable walls and said bottom wall, said upper trim portion of said second member having a peripheral edge engageable with said surface of said structure when said lower section is fully inserted in said slot and operable to conceal said groove and said first member, said lower portion of said second member having longitudinally extending opposite lateral sides having serrations thereon for frictionally engaging the ramp means on the inner surfaces of said pair of opposite lateral side walls of said first member to inhibit withdrawl of said lower portion from said slot, said lower portion of said second member comprising second recesses for accommodating said second projections.

14. Means according to claim 13 wherein said opposite lateral side surfaces of said groove are sloped so that said groove, measured transversely, is wider at the bottom than at the top;

wherein the inner surfaces of said opposite lateral side walls of said first member is provided with sloped ramps at spaced apart locations therealong so that portions of said slot, measured transversely, are wider at the top than at the bottom;

and wherein said lower portion of said second member, measured transversely at said locations is wider at the bottom than the width of the bottom of said slot so that, when said lower portion of said second member is inserted in said slot, said lateral outer surfaces of said first member move outwardly to engage said sloped lateral side surfaces of said groove.

* * * * *